Jan. 29, 1929.

W. GYMER

SPOON HOLDER

Filed Jan. 13, 1928

Inventor
W. Gymer

By Lacey & Lacey, Attorneys

Patented Jan. 29, 1929.

1,700,200

UNITED STATES PATENT OFFICE.

WILLIAM GYMER, OF EAST RYEGATE, VERMONT.

SPOON HOLDER.

Application filed January 13, 1928. Serial No. 246,563.

The present invention is directed to improvements in spoon holders.

The primary object of this invention is to provide an article of this character so constructed that it can be conveniently attached to a dish or pan and when in place thereon will prevent the spoon from slipping into the vessel.

Another object of the invention is to provide a device of this kind formed of sheet metal and so constructed that it will firmly grip the pan or dish to prevent accidental disengagement therefrom.

Another object of the invention is to provide a device of this kind which is simply constructed, efficient in operation and which can be manufactured at a very small cost.

With these and other objects in view, this invention resides in the novel features of construction, formation, combination and arrangement of parts to be hereinafter more fully described, claimed, and illustrated in the accompanying drawing, in which:

Figure 1:
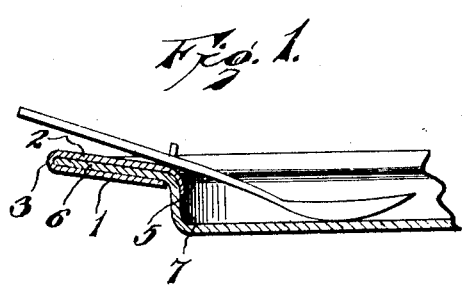
Figure 1 is a fragmentary sectional view of a vessel showing the device in place thereon.
Figure 2:
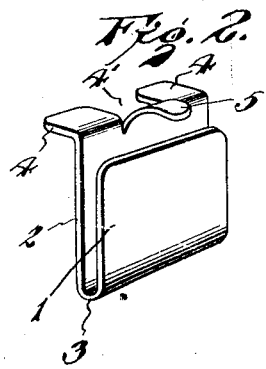
Figure 2 is a perspective view of the device.

The holder as illustrated in Figures 1 and 2, consists of a pair of plates 1 and 2 resiliently connected as at 3, the plate 2 being slightly longer than the plate 1 and having its free edge provided with spaced ears 4 which are disposed in angular relation with respect to the plate, the material cut to provide the slot 4' constituting a tongue 5 which is bent in a direction opposite to the ears 4 and is curved longitudinally to conform to the curvature of the vessel at the juncture of the rim 6 and wall 7 thereof. It will thus be seen that the plate 1 will engage under the rim 6 while the plate 2 will engage upon the upper surface thereof and at which time the tongue 5 will engage the vessel in such manner as to prevent accidental disengagement of the holder therefrom.

Figure 3:
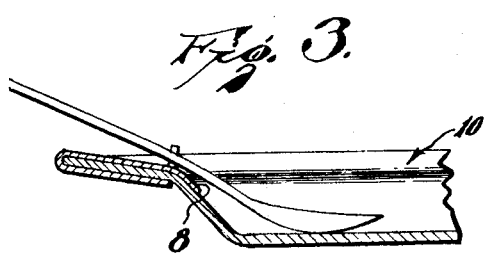
Figure 3 is a view showing a slightly modified form of the invention, also being shown partly in section.
Figure 4:
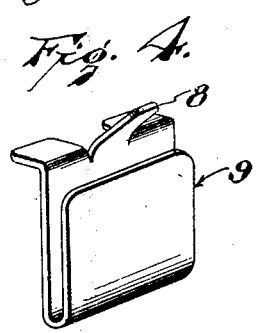
Figure 4 is a perspective view of the holder used in connection with the vessel shown in Figure 3.
Figure 5:
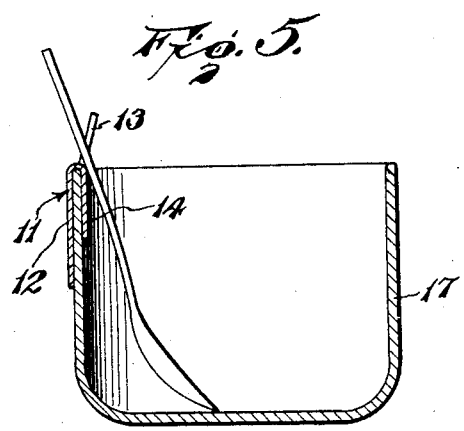
Figure 5 is a vertical sectional view showing the holder used in connection with a bowl or straight wall vessel.
Figure 6:
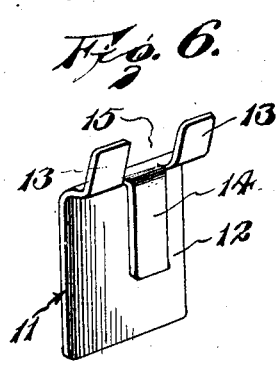
Figure 6 is a perspective view of the holder used in connection with the bowl shown in Figure 5.

In Figures 3 and 4, the holder is of the same general shape as that shown in the preferred form of the invention with the exception that the angle of the tongue 8 of the holder 9 has a somewhat different curvature to correspond to a vessel 10 of a slightly modified shape. In Figures 5 and 6, the holder 11 comprises a single plate 12, the upper edge of which terminates in upwardly extending ears 13, the material forming the tongue 14 leaving a space 15 between the ears to accommodate the spoon. In this form of the invention, the plate 12 will engage the outer surface of the bowl 17 while the tongue 14 will engage the inner surface thereof, thus positioning the ears 13 as shown in Figure 5.

From the foregoing description, it will be seen that the device will effectively hold a spoon from slipping into a vessel, and since the usual spoons are provided with shoulders, the shank of the spoon can be conveniently accommodated in the spaces between the ears, whereas the shoulders of the spoon will engage therewith to prevent the spoon from slipping into the vessel.

What is claimed is:

As a new article of manufacture, a spoon holder comprising a resilient U-shaped plate, the arms of which being of unequal length, the free end of the longer arm having a pair of ears and a tongue thereon, said tongue being extended in a direction away from the ears to overhang the free end of the shorter plate.

In testimony whereof I affix my signature.

WILLIAM GYMER. [L. S.]